(12) United States Patent
Griggs

(10) Patent No.: US 9,519,872 B2
(45) Date of Patent: Dec. 13, 2016

(54) SYSTEMATIC DISCOVERY OF BUSINESS ONTOLOGY

(71) Applicant: WAL-MART STORES, INC., Bentonville, AR (US)

(72) Inventor: Gary Dewayne Griggs, Cave Springs, AR (US)

(73) Assignee: WAL-MART STORES, INC., Bentonville, AR (US)

( * ) Notice: Subject to any disclaimer, the term of this patent is extended or adjusted under 35 U.S.C. 154(b) by 353 days.

(21) Appl. No.: 13/974,318

(22) Filed: Aug. 23, 2013

(65) Prior Publication Data

US 2015/0058248 A1    Feb. 26, 2015

(51) Int. Cl.
*G06F 17/30* (2006.01)
*G06F 7/00* (2006.01)
*G06Q 10/00* (2012.01)

(52) U.S. Cl.
CPC ......... *G06Q 10/00* (2013.01); *G06F 17/30412* (2013.01); *G06F 17/30598* (2013.01); *G06F 17/30705* (2013.01)

(58) Field of Classification Search
None
See application file for complete search history.

(56) References Cited

U.S. PATENT DOCUMENTS

| | | | |
|---|---|---|---|
| 6,199,034 B1 * | 3/2001 | Wical | 704/9 |
| 2003/0088543 A1 * | 5/2003 | Skeen et al. | 707/1 |
| 2004/0117346 A1 * | 6/2004 | Stoffel et al. | 707/1 |
| 2012/0030202 A1 * | 2/2012 | B'Far et al. | 707/737 |
| 2013/0085745 A1 * | 4/2013 | Koister et al. | 704/9 |
| 2013/0185303 A1 * | 7/2013 | Ceusters et al. | 707/737 |
| 2013/0191735 A1 * | 7/2013 | Kumar et al. | 715/254 |
| 2013/0205252 A1 * | 8/2013 | Mandelstein et al. | 715/810 |
| 2014/0278364 A1 * | 9/2014 | Grosset et al. | 704/9 |

* cited by examiner

*Primary Examiner* — Dung K Chau
(74) *Attorney, Agent, or Firm* — Schmeiser, Olsen + Watts LLP

(57) ABSTRACT

A system is provided that implements a more systematic process for obtaining business knowledge that is more efficient and timely. The process automatically reads business documents and produces a business ontology. In one implementation, the process dissects documents into sentences or collection of words that most resembles a sentence. Natural language processing algorithms may be used to identify the role of term within a sentence. Terms and associations resulting from the document analysis are used to specify a business ontology which can be then used to provide input to a software design process, among other business uses.

18 Claims, 6 Drawing Sheets

SYSTEMATIC DISCOVERY OF BUSINESS ONTOLOGY

BACKGROUND

There are many different methods for processing and accumulating business knowledge. Such knowledge is generally needed when producing software for the business. However, often the best source of business knowledge of an organization generally involves interviewing a number of employees of the business, and by manually reverse engineering applications, which can be expensive and time consuming.

SUMMARY

According to one aspect, it is appreciated that it may be useful and particularly advantageous to provide a more systematic process for obtaining business knowledge that is more efficient and timely. In particular, it is appreciated that it may take many hours to extract business knowledge relating to a software development project. Such information is generally needed by early phases of the project. In most cases, such information is needed before the project is started, and delay in receiving business knowledge reduces the value the business knowledge will have on the project. According to one embodiment, a system and method is provided that allows extraction of a business ontology or language that may be used for understanding a client's business. Such an extraction may be made, for example, from existing business documents associated with that particular business.

According to one embodiment, an automated process is provided to analyze business documents to determine business ontology. There are many existing applications that can obtain terms within documents, however, it would be beneficial to have a capability to identify terms and their associations within the documents, and to understand those associations. According to one aspect of the present invention, a process is provided that reads business documents and dissects them into sentences or collection of words that most resembles a sentence. Natural language processing algorithms may be used to identify the role of term within a sentence. Nouns that are located next reach other within sentences are identified as term groups.

The identification of term groups allows for analysis of each individual word and combinations of words as terms. For example, the term group "subject matter expert" creates the following terms: subject, matter, expert, subject matter, matter expert, and subject matter expert. The understanding of all possible terms may be used to determine association types.

Adjectives that are located next to term groups are identified along with an adjacent term group to understand how the term group may be described. Verbs may be identified along with the term groups that occur before and after the firm in the sentence. Once the roles and locations of terms are identified, a set of associations may be made. Understanding terms that are used and how the terms are used with one another may be used as a foundation for understanding the business language. More particularly, a term's association not only identify how determines use but also lends to the term's definition.

As discussed above, a number of associations may be determined. For instance, what is termed as an immediate proximity may be created for any terms that are adjacent to one another within a sentence. This association may be further identified as either a former immediate proximity association or a latter immediate proximity association. The former immediate proximity association defines an association to a term that is located immediately after the term within a sentence. The immediate proximity association may be used to understand how terms may be typed, qualified or described by other terms.

According to one embodiment, a sentence proximity association is created for any terms that occur in the same sentence but are not in the same term group. Sentence proximity association may be used to understand how terms interact with the lifecycle of another term. It may also be used to understand the uniqueness of information concepts by qualifying that two terms used in the same sentence refer to separate information concepts.

A term proximity association may be created for any terms or terms group before and after the term(s) within a sentence. The association identifies the actions that are acted upon terms by other terms. A document proximity association is created for all verbs that are in the same document. The association identifies terms that share the same topic were scope by being within the same document.

Once all business documents within a given scope are processed, results may be analyzed to identify terms and associations that are used within that scope. The results may be analyzed to create a current state ontology. A full complement of associations may allow for a more complete understanding of how the terms are used in relation to one another as well as how each term is defined. This understanding leads to a better alignment of business processes and supporting applications.

According to one aspect, a system for determining a business ontology is provided. The system comprises a memory; and a processor coupled to the memory, wherein the processor is configured to perform an analysis of a plurality of business documents, wherein the analysis comprises determining a plurality of sentences within the plurality of business documents; identifying terms and associations within the plurality of sentences; identifying frequently-used terms and associations within the plurality of sentences; and determining a business ontology based on the identified frequently-used terms and associations within the plurality of sentences. In one embodiment, the processor is adapted to group terms into term groups.

In one embodiment, the processor is adapted to determine an association by a proximity between at least two of the terms within at least one sentence. In one embodiment, the proximity is at least one of a group comprising a former proximity and a latter proximity. In one embodiment, the processor is adapted to determine an association by a proximity between at least two of the terms within at least one document. In one embodiment, the processor is adapted to determine an association by a verb between at least two of the terms. In one embodiment, the processor is adapted to determine an aspect of software using the determined business ontology. In one embodiment, the processor is adapted to determine an information model using the determined business ontology. In one embodiment, the processor is adapted to group terms and associations together based on their meaning. In one embodiment, the processor is adapted to store, in the memory, a database including the identified terms and associations.

According to one aspect, a method for determining a business ontology is provided. The method comprises acts of performing an analysis by a computer system of a plurality of business documents, wherein the analysis comprises acts of determining a plurality of sentences within the plurality of business documents; identifying terms and associations within the plurality of sentences; identifying frequently-used terms and associations within the plurality of sentences; and determining a business ontology based on the identified frequently-used terms and associations within the plurality of sentences. In one embodiment, the method further comprises an act of grouping terms into term groups. In one embodiment, the method further comprises an act of determining an association by a proximity between at least two of the terms within at least one sentence. In one embodiment, the proximity is at least one of a group comprising a former proximity and a latter proximity. In one embodiment, the method further comprises an act of determining an association by a proximity between at least two of the terms within at least one document. In one embodiment, the method further comprises an act of determining an association by a verb between at least two of the terms. In one embodiment, the method further comprises an act of determining an aspect of software using the determined business ontology. In one embodiment, the method further comprises an act of determining an information model using the determined business ontology. In one embodiment, the method further comprises an act of grouping terms and associations together based on their meaning. In one embodiment, the method further comprises an act of storing, in a memory of the computer system, a database including the identified terms and associations.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1A:
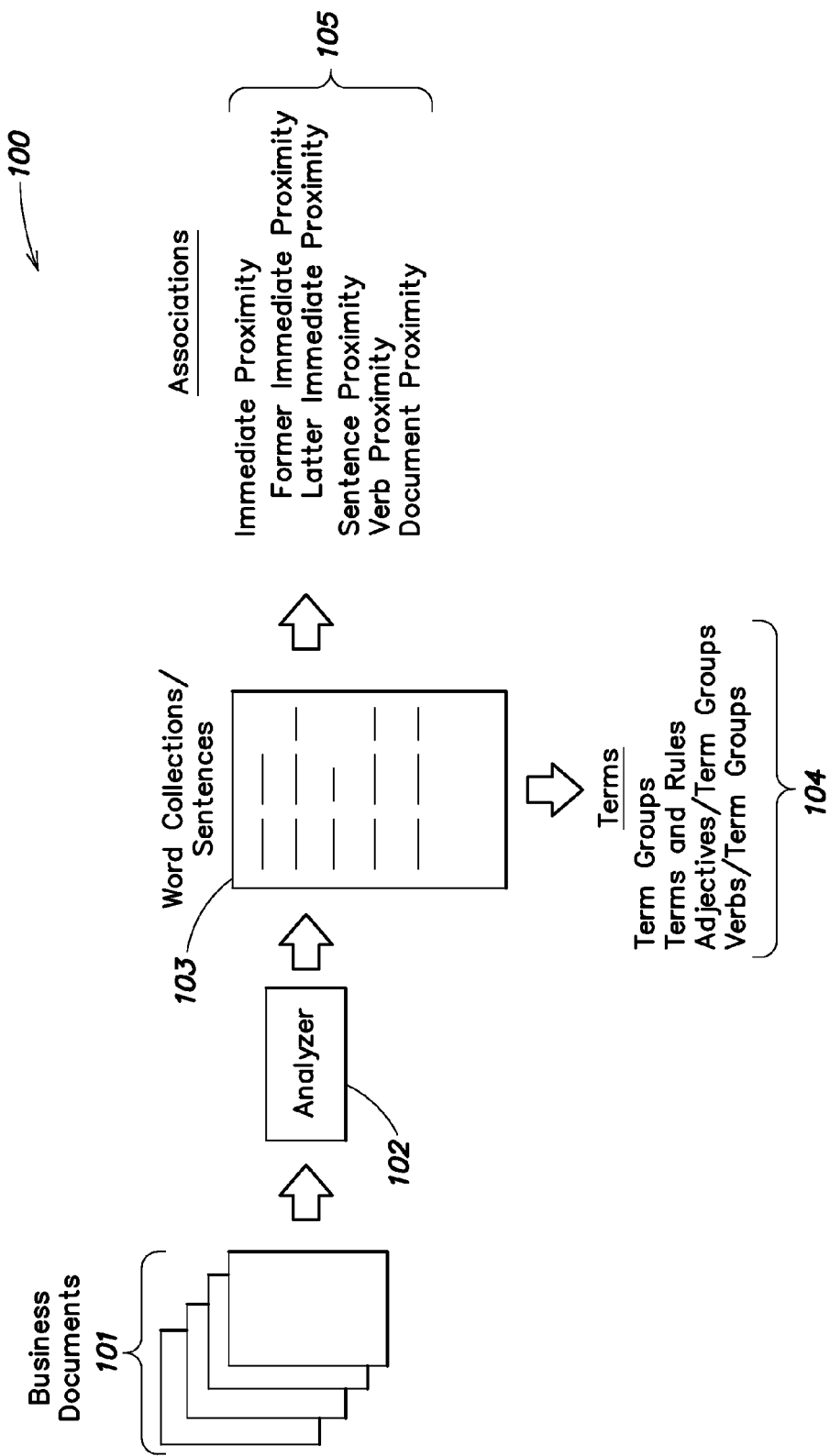
FIGS. 1A-1B show a block diagram of processing for discovering business ontology according to various aspects of the present invention.
Figure 1B:
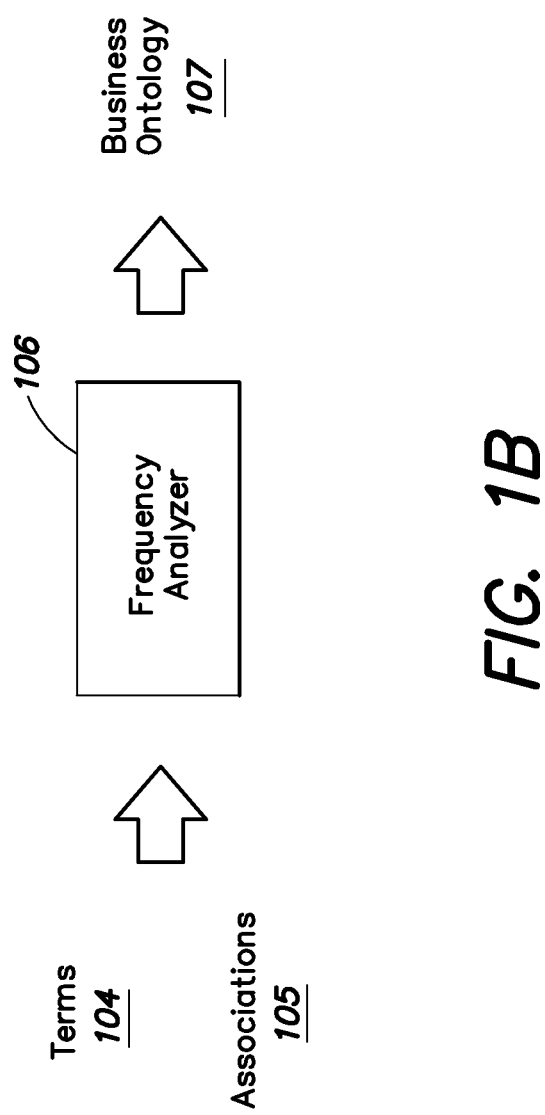

FIGS. 1A-1B show block diagrams of a process 100 suitable for implementing various aspects of the present invention. In particular, according to one embodiment, FIGS. 1A-1B show a process 100 for discovering business ontology according to various embodiments of the present invention. More particularly, one or more business documents 101 may be analyzed (e.g., by an analyzer 102) to identify certain meaningful information within those documents. For instance, business documents may be processed to identify a number of word collections (e.g., sentences or group of words that appear like sentences) and their proximity to other words or collections of words.

The sentences may be further processed to identify terms (e.g., item 104) and their associations (e.g., item 105). In particular, terms, groups of terms, terms and their roles, and adjectives in relation to term groups and verbs in relation to term groups are analyzed. Further, associations as discussed above such as immediate proximity, former immediate proximity, latter immediate proximity, sentence proximity, verb proximity, and document proximity information is analyzed.

As shown in FIG. 1B, the terms 104 and the associations 105 are provided to a frequency analyzer 106 to identify the terms and associations that are use the most within that scope. The results are then analyzed to create a business ontology 107.

In a practical example, the system may be capable of opening and reading the contents of typical business documents such as Microsoft Word, Excel, PowerPoint and Adobe Acrobat files, although it should be appreciated that any document type may be used. For instance, in the case of a Microsoft Word document, the Microsoft Word application may be used to turn the contents of a particular document into an array of sentences. Conventional natural language processing algorithms may be used to identify the role of each term within each sentence. For instance, the OpenNLP natural language processing algorithms from Apache may be used to perform such functions. A process may be used to identify relationships between the terms in the sentence based on their role and their position relative to one another. The resulting terms, roles and relationships may be stored within a database. For instance, a database may be provided that stores the terms, roles and relationship information.

Once analyzed (e.g., after analyzing multiple business documents of a collection of business documents), terms may be grouped that have similar relationships. For instance, clustering algorithms may be used to provide such a function. This process represents one example of a discovery phase of an organization's current state ontology. The result of this process may provide a ranked list of terms based on use, a ranked list of relationships based on use and collections of terms with similar relationships.

Figure 2:
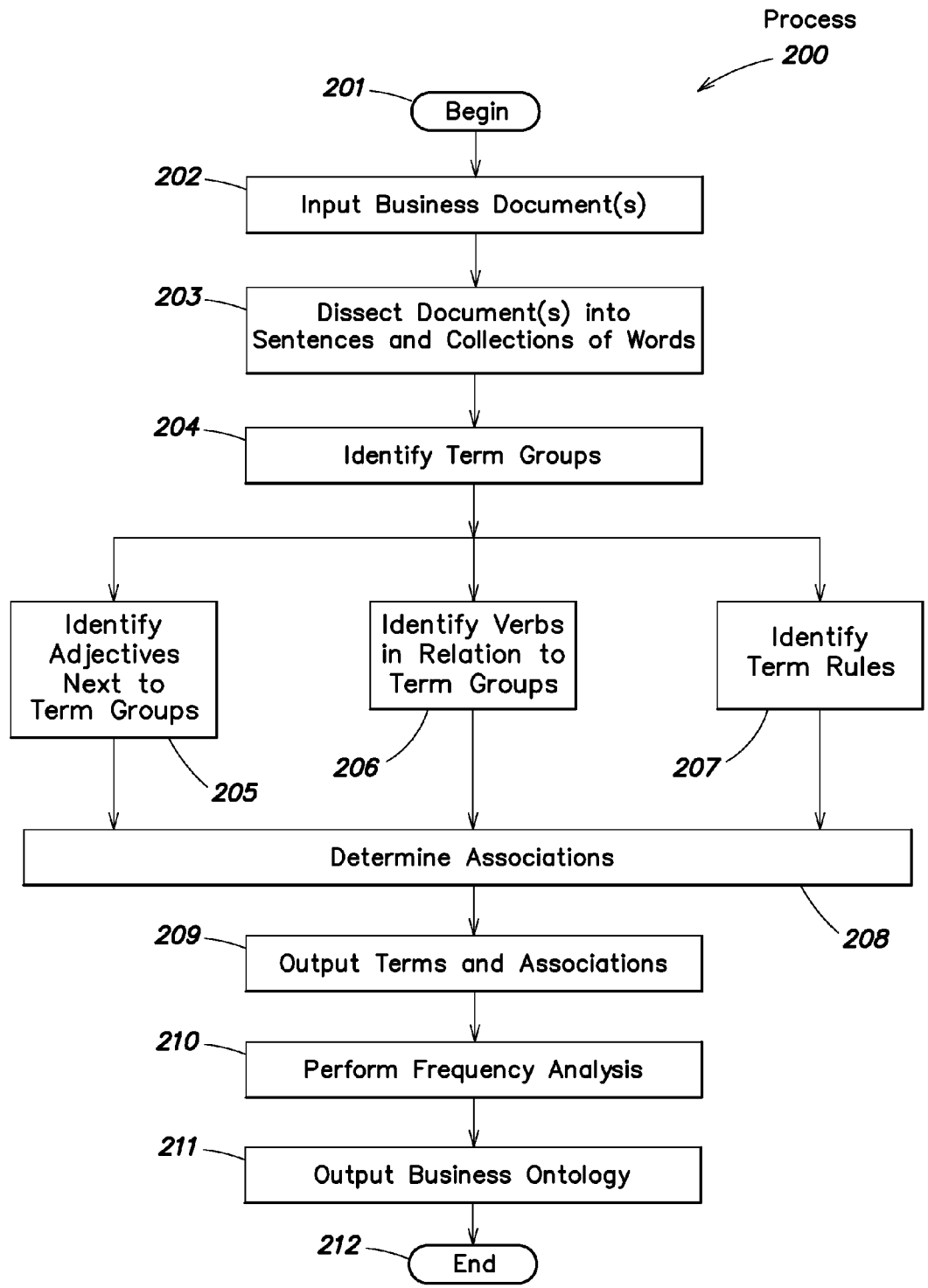
FIG. 2 shows another embodiment of a method for discovering business ontology from input business documents according to various embodiments of the present invention.

FIG. 2 shows another embodiment of a method for discovering business ontology from input business documents according to various embodiments of the present invention. At block 201, process 200 begins. At block 202, one or more input business documents are analyzed (e.g., by a computer system). The process dissects the one or more documents into sentences and collections of words at block 203. For instance, a process (e.g., a natural language function that parses a document and identifies sentences) may be provided that analyzes each document and separates sentences for analysis. At block 204, the process identifies term groups within the sentences and collections of words. In one implementation, a process (e.g., another natural language analysis function) identifies terms and term groups within these sentences.

Further, the process may identify adjectives next to terms and term groups (e.g., at block 205), identify verbs in relation to terms and term groups (e.g. at block 206), and may identify term rules (e.g. at block 207). At block 208, the process determines associations between terms. The process outputs terms and associations at block 209. At block 210, the system performs a frequency analysis of the terms and associations to identify the most frequently used term groups and their associations. At block 211 system outputs a description of a business ontology based on these documents. At block 212, process 200 ends.

Below is an example of the terms and associations identified within a sentence that may be produced by a typical analysis of a sentence:
Example Sentence: A purchase order was created by the fresh produce buyer.
Terms
   Purchase
   Order
   Purchase Order
   Created
   Fresh
   Produce
   Buyer
   Fresh Produce
   Produce Buyer
   Fresh Produce Buyer
Associations
   Immediate Former Proximity: Order—Purchase
   Immediate Latter Proximity: Purchase—Order
   Immediate Former Proximity: Produce—Fresh
   Immediate Former Proximity: Buyer—Produce
   Immediate Former Proximity: Produce—Buyer Fresh
   Immediate Latter Proximity: Fresh—Produce
   Immediate Latter Proximity: Produce—Buyer
   Immediate Latter Proximity: Fresh—Produce Buyer
   Sentence Proximity: Purchase—Created
   Sentence Proximity: Purchase—Fresh
   Sentence Proximity: Purchase—Produce
   Sentence Proximity: Purchase—Buyer
   Sentence Proximity: Purchase—Fresh Produce
   Sentence Proximity: Purchase—Produce Buyer
   Sentence Proximity: Purchase—Fresh Produce Buyer
   Sentence Proximity: Created—Fresh
   Sentence Proximity: Created—Produce
   Sentence Proximity: Created—Buyer
   Sentence Proximity: Created—Fresh Produce
   Sentence Proximity: Created—Produce Buyer
   Sentence Proximity: Created—Fresh Produce Buyer
   Verb Proximity: Purchase—Order Created Fresh Produce Supplier
   Document Proximity: Purchase—Created
   Document Proximity: Purchase—Fresh
   Document Proximity: Purchase—Produce
   Document Proximity: Purchase—Buyer
   Document Proximity: Purchase—Fresh Produce
   Document Proximity: Purchase—Produce Buyer
   Document Proximity: Purchase—Fresh Produce Buyer
   Document Proximity: Created—Fresh
   Document Proximity: Created—Produce
   Document Proximity: Created—Buyer
   Document Proximity: Created—Fresh Produce
   Document Proximity: Created—Produce Buyer
   Document Proximity: Created—Fresh Produce Buyer Each sentence within the document may be analyzed in this manner, and an output produced for each document. Once all business documents within a given scope are read, collective results of all of the documents may be analyzed to identify the terms and associations that are used most within that scope. For instance, a frequency analysis may be used to determine more frequently-used terms and associations. Further, terms and associations having similar meaning may be clustered using clustering algorithms. The results may be analyzed to create a current state ontology (e.g., one using the most frequently-used terms and associations).

Figure 3:
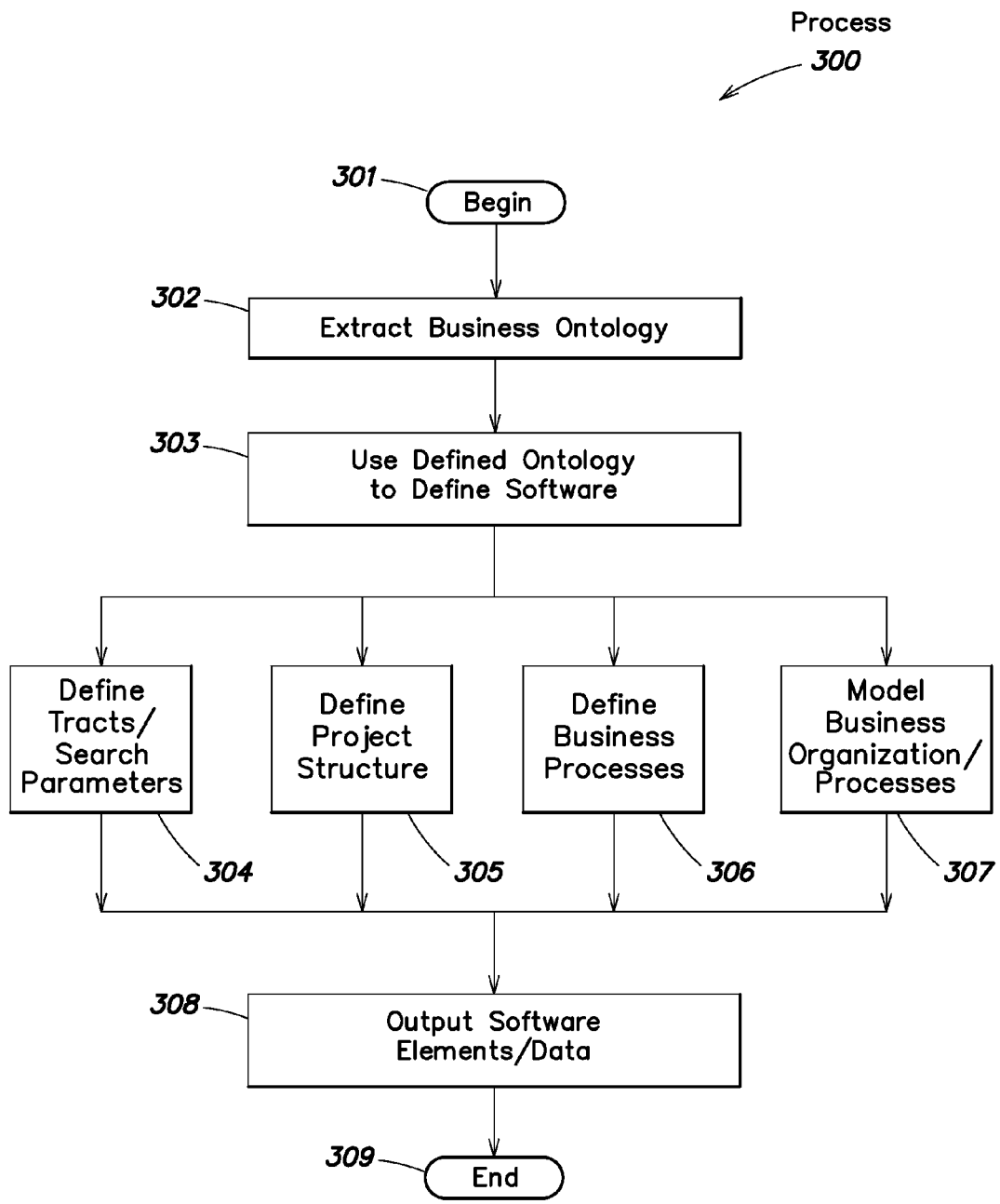
FIG. 3 shows a process for using the discovered business ontology according to various embodiments of the present invention.

There may be many uses of such a discovered business ontology, including those related to software support and development. FIG. 3 shows an example process 300 for using the discovered business ontology according to various embodiments of the present invention. At block 301, process 300 begins. At block 302 the system extracts the business ontology from one or more business documents.

At block 303, the defined ontology may be used to define or assist and defining software elements. For example, at block 304, the defined ontology may be used to define facets for a business database and/or define search parameters for a particular data set. In another example, the defined ontology may be used to define a project structure (e.g., at block 305). For instance, the ontology may be used to define an information model that is used by software. In yet another example, the ontology may be used to define one or more business processes (e.g., at block 306). Further, the ontology be used to model a business organization and their associated processes (e.g. at block 307). At block 308, process outputs software elements and/or their associated data and structure. At block 309, process 300 ends.

A cornerstone artifact in designing a business process or a supporting application in software is the Information Model. It is appreciated that the Information Model typically identifies what information is in scope of the effort and how the information is related to one another. For example, the business process of a customer buying products includes Customer, Order and Item entities. The Customer is related to Order and the Order is related to Items. Therefore, if expressed in this manner, the business ontology provides us an understanding that the three entities are involved and how they are related to one another. Another use of this business ontology discovery includes understanding the context, or the uses, of entities. For example, the Order entity can have a supply chain context and a military context. This business ontology discovery can identify multiple contexts through the associations with terms from each of those contexts. Therefore, the discovery of terms and their relations can be used directly by a process to create business processes and information models for the creation of software.

Example Computer Implementations

Processes described above are merely illustrative embodiments of systems that may be used to analyze business documents to determine a business ontology. Such illustrative embodiments are not intended to limit the scope of the present invention, as any of numerous other implementations for performing the invention. None of the claims set forth below are intended to be limited to any particular implementation of a system, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, ARM Cortex processor, Qualcomm Scorpion processor, or any other type of processor. It should be appreciated that one or more of any type computer system may be used to determine a business ontology according to various embodiments of the invention. Further, the software design system may be located on a single computer or may be distributed among a plurality of computers attached by a communications network.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. Computer system may be also implemented using specially programmed, special purpose hardware. In a computer system there may be a processor that is typically a commercially available processor such as the well-known Pentium class processor available from the Intel Corporation. Many other processors are available. Such a processor usually executes an operating system which may be, for example, the Windows NT, Windows 2000 (Windows ME), Windows XP, Windows Vista, Windows 7, or Windows 8 operating systems available from the Microsoft Corporation, MAC OS X Snow Leopard, MAC OS X Lion operating systems available from Apple Computer, the Solaris Operating System available from Sun Microsystems, iOS, Blackberry OS, Windows 7 Mobile or Android OS operating systems, or UNIX available from various sources. Many other operating systems may be used.

Some aspects of the invention may be implemented as distributed application components that may be executed on a number of different types of systems coupled over a computer network. Some components may be located and executed on mobile devices, servers, tablets, or other system types. Other components of a distributed system may also be used, such as databases (e.g., the mongoDB database available from 10gen, Inc.), cloud services, or other component types.

The processor and operating system together define a computer platform for which application programs in high-level programming languages are written. It should be understood that the invention is not limited to a particular computer system platform, processor, operating system, or network. Further, it should be appreciated that multiple computer platform types may be used in a distributed computer system that implement various aspects of the present invention. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). Certain aspects of the present invention may also be implemented on a cloud-based computer system (e.g., the EC2 cloud-based computing platform provided by Amazon.com), a distributed computer network including clients and servers, or any combination of systems.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Further, on each of the one or more computer systems that include one or more components of distributed system 100, each of the components may reside in one or more locations on the system. For example, different portions of the components of system 100 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 4:
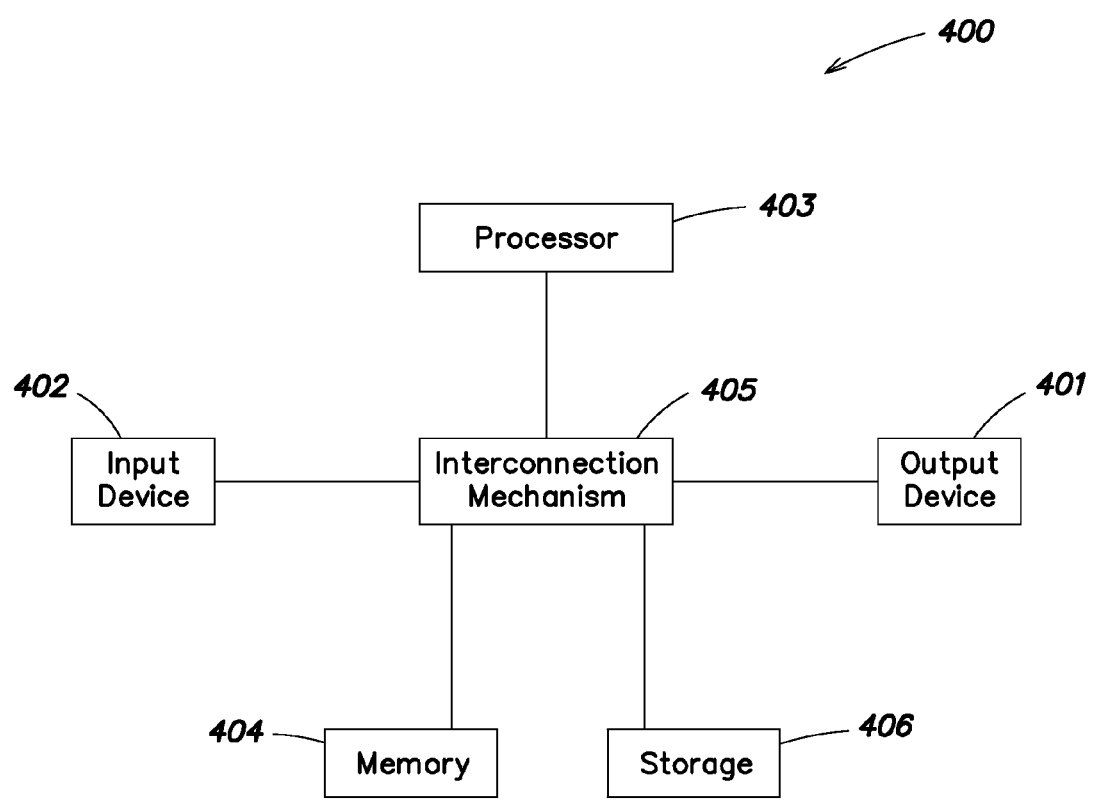
FIG. 4 shows an example computer system with which various aspects of the invention may be practiced.
Figure 5:
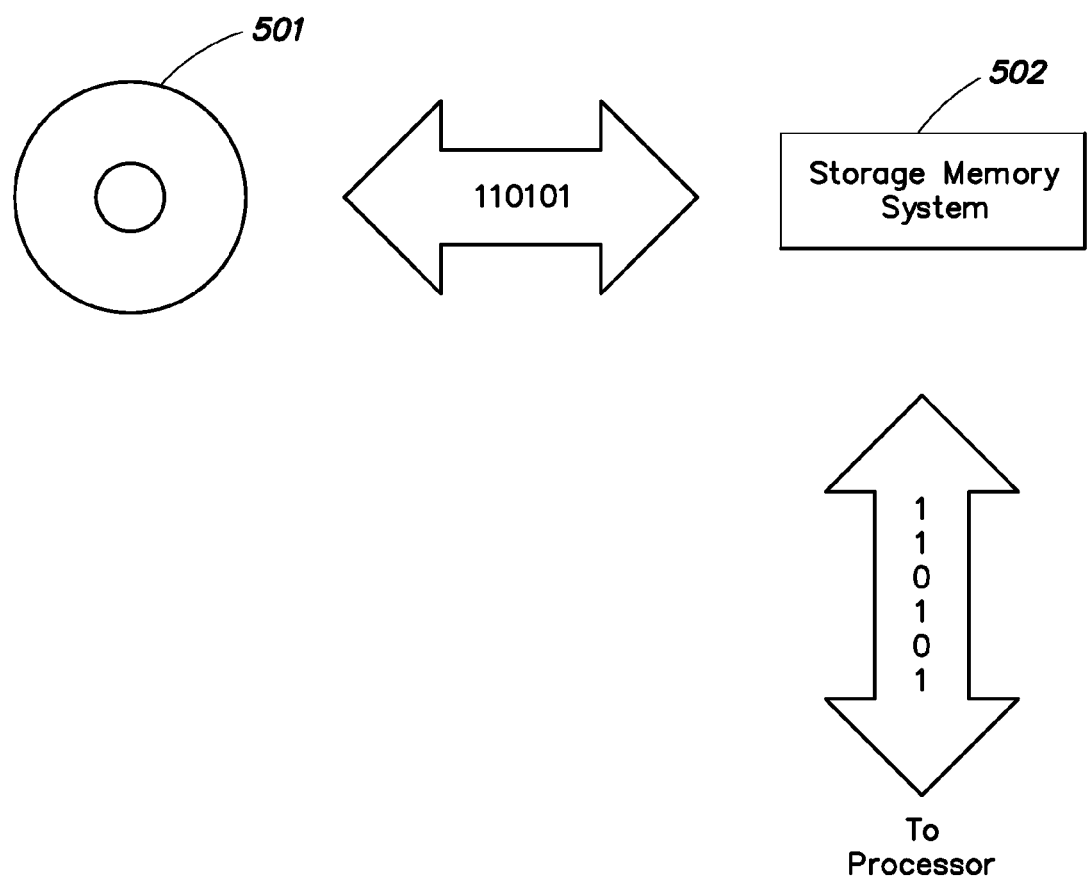
FIG. 5 shows an example storage system capable of implementing various aspects of the present invention.

Any number of systems of system 100 may be implemented on a computer system described below in relation to FIGS. 4 and 5. In particular, FIG. 4 shows an example computer system 400 used to implement various aspects. FIG. 5 shows an example storage system that may be used.

System 400 is merely an illustrative embodiment of a computer system suitable for implementing various aspects of the invention. Such an illustrative embodiment is not intended to limit the scope of the invention, as any of numerous other implementations of the system, for example, are possible and are intended to fall within the scope of the invention. For example, a virtual computing platform may be used. None of the claims set forth below are intended to be limited to any particular implementation of the system unless such claim includes a limitation explicitly reciting a particular implementation.

For example, various aspects of the invention may be implemented as specialized software executing in a general-purpose computer system 400 such as that shown in FIG. 4. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, scanner, trackball, microphone, touch screen, and one or more output devices 401, for example, a printing device, display screen, and/or speaker. The system may also include any specialized components depending on the application, including any barcode reader, magnetic stripe reader, receipt printer, handheld or fixed scanners, pin entry devices (PED), or other device types. In addition, computer system 400 may contain one or more interfaces (not shown) that connect computer system 400 to a communication network (in addition or as an alternative to the interconnection mechanism 405).

The storage system 406, shown in greater detail in FIG. 5, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 4. Various aspects of the invention may be practiced on one or more computers having a different architecture or components that that shown in FIG. 4.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium, Core, Core Vpro, Xeon, or Itanium class processors available from the Intel Corporation. Many other processors are available. Such a processor usually executes an operating system which may be, for example, the Windows NT, Windows 2000 (Windows ME), Windows XP, Windows Vista, Windows 7 or Windows 8 operating systems available from the Microsoft Corporation, MAC OS Snow Leopard, MAC OS X Lion operating systems available from Apple Computer, the Solaris Operating System available from Sun Microsystems, iOS, Blackberry OS, Windows 7 or 8 Mobile or Android OS operating systems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present invention may be implemented in a cloud-based computing platform, such as the well-known EC2 platform available commercially from Amazon.com, Seattle, Wash., among others. Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for determining a business ontology, the system comprising:
a memory; and
a processor coupled to the memory, wherein the processor is configured to:
perform an analysis of a plurality of business documents, wherein the analysis comprises:
establishing an analysis scope that includes the plurality of business documents;
determining a plurality of sentences within the plurality of business documents within the analysis scope, including separating the sentences for analysis;
identifying terms and associations between terms within each separated sentence of the plurality of sentences, including determining a proximity between at least two of the terms within at least one sentence of the separated sentences, the proximity including a sentence proximity association for terms of the identified terms occurring in the same sentence but not in a same term group, a term proximity association for identifying actions acted upon terms of the identified terms by other terms, and a document proximity association for all verbs in the same business document of the plurality of business documents;
analyzing the associations including the sentence proximity association, the term proximity association, and the document proximity association;
after analyzing the terms and associations, identifying frequently-used terms and associations within the plurality of sentences used most within the scope; and
determining a business ontology based on the identified frequently-used terms and associations within the plurality of sentences among the plurality of business documents.

2. The system according to claim 1, wherein the processor groups terms into term groups.

3. The system according to claim 1, wherein the proximity is at least one of a group comprising a former proximity and a latter proximity.

4. The system according to claim 1, wherein the processor determines an association by a proximity between at least two of the terms within at least one document.

5. The system according to claim 1, wherein the processor determines an association by a verb between at least two of the terms.

6. The system according to claim 1, wherein the processor determines an aspect of software using the determined business ontology.

7. The system according to claim 6, wherein the processor determines an information model using the determined business ontology.

8. The system according to claim 1, wherein the processor groups terms and associations together based on their meaning.

9. The system according to claim 1, wherein the processor stores, in the memory, a database including the identified terms and associations.

10. A method for determining a business ontology, the method comprising acts of:
performing an analysis by a computer system of a plurality of business documents, wherein the analysis comprises acts of:
establishing an analysis scope that includes the plurality of business documents;
determining a plurality of sentences within the plurality of business documents within the analysis scope, including separating the sentences for analysis;
identifying terms and associations between terms within each separated sentence of the plurality of sentences, including determining a proximity between at least two of the terms within at least one sentence of the separated sentences, the proximity including a sentence proximity association for terms of the identified terms occurring in the same sentence but not in a same term group, a term proximity association for identifying actions acted upon terms of the identified terms by other terms, and a document proximity association for all verbs in the same business document of the plurality of business documents;

analyzing the terms and associations including the sentence proximity association, the term proximity association, and the document proximity association;

after analyzing the terms and associations, identifying frequently-used terms and associations within the plurality of sentences used most within the scope; and determining a business ontology based on the identified frequently-used terms and associations within the plurality of sentences among the plurality of business documents.

11. The method according to claim 10, further comprising an act of grouping terms into term groups.

12. The method according to claim 10, wherein the proximity is at least one of a group comprising a former proximity and a latter proximity.

13. The method according to claim 10, further comprising an act of determining an association by a proximity between at least two of the terms within at least one document.

14. The method according to claim 10, further comprising an act of determining an association by a verb between at least two of the terms.

15. The method according to claim 10, further comprising an act of determining an aspect of software using the determined business ontology.

16. The method according to claim 15, further comprising an act of determining an information model using the determined business ontology.

17. The method according to claim 10, further comprising an act of grouping terms and associations together based on their meaning.

18. The method according to claim 10, further comprising an act of storing, in a memory of the computer system, a database including the identified terms and associations.

* * * * *